United States Patent [19]

Yoshihara et al.

[11] Patent Number: 5,768,763
[45] Date of Patent: *Jun. 23, 1998

[54] METHOD AND APPARATUS FOR GROOVING ON ROTOR

[75] Inventors: Nobuyuki Yoshihara; Masatoshi Tashima, both of Hyogo, Japan

[73] Assignee: Mitsubishi Denki Kubushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 555,411

[22] Filed: Nov. 9, 1995

[30] Foreign Application Priority Data

Nov. 17, 1994 [JP] Japan .................................. 6-310025

[51] Int. Cl.$^6$ .................................................. H02K 15/02
[52] U.S. Cl. ................................ 29/598; 72/111; 72/471
[58] Field of Search .................................. 29/598; 72/70, 72/88, 108, 111, 470, 471

[56] References Cited

U.S. PATENT DOCUMENTS 2,699,077  1/1955  Bedker ........................................ 72/70
4,722,211  2/1988  Tsukamoto et al. ........................ 72/70

FOREIGN PATENT DOCUMENTS

| 1602684 | 12/1970 | Germany . |
| 50-4191 | 2/1975 | Japan ..................................... 72/108 |
| 60-32551 | 2/1985 | Japan ..................................... 29/598 |
| 62-234630 | 10/1987 | Japan ..................................... 72/108 |
| 3-139149 | 6/1991 | Japan . |
| 2098901 | 12/1982 | United Kingdom ..................... 72/108 |

*Primary Examiner*—S. Thomas Hughes
*Attorney, Agent, or Firm*—Sughrue, Mion, Zinn, Macpeak & Seas, PLLC

[57] ABSTRACT

Grooves are formed on a rotor by rotor holders for holding a rotor at both ends of a rotary shaft thereof, a groove rolling die for forming grooves in the outer surfaces of the field cores of the rotor, and a holder die having a groove pattern in conformity with a pattern of the grooves that are formed in the outer surfaces of the field cores by the groove rolling die. When the grooves are formed, the grooves are uniform in depth over the entire length of the magnetic poles from the root to the top, thereby preventing the eddy-current loss reduction effect from being deteriorated.

7 Claims, 16 Drawing Sheets

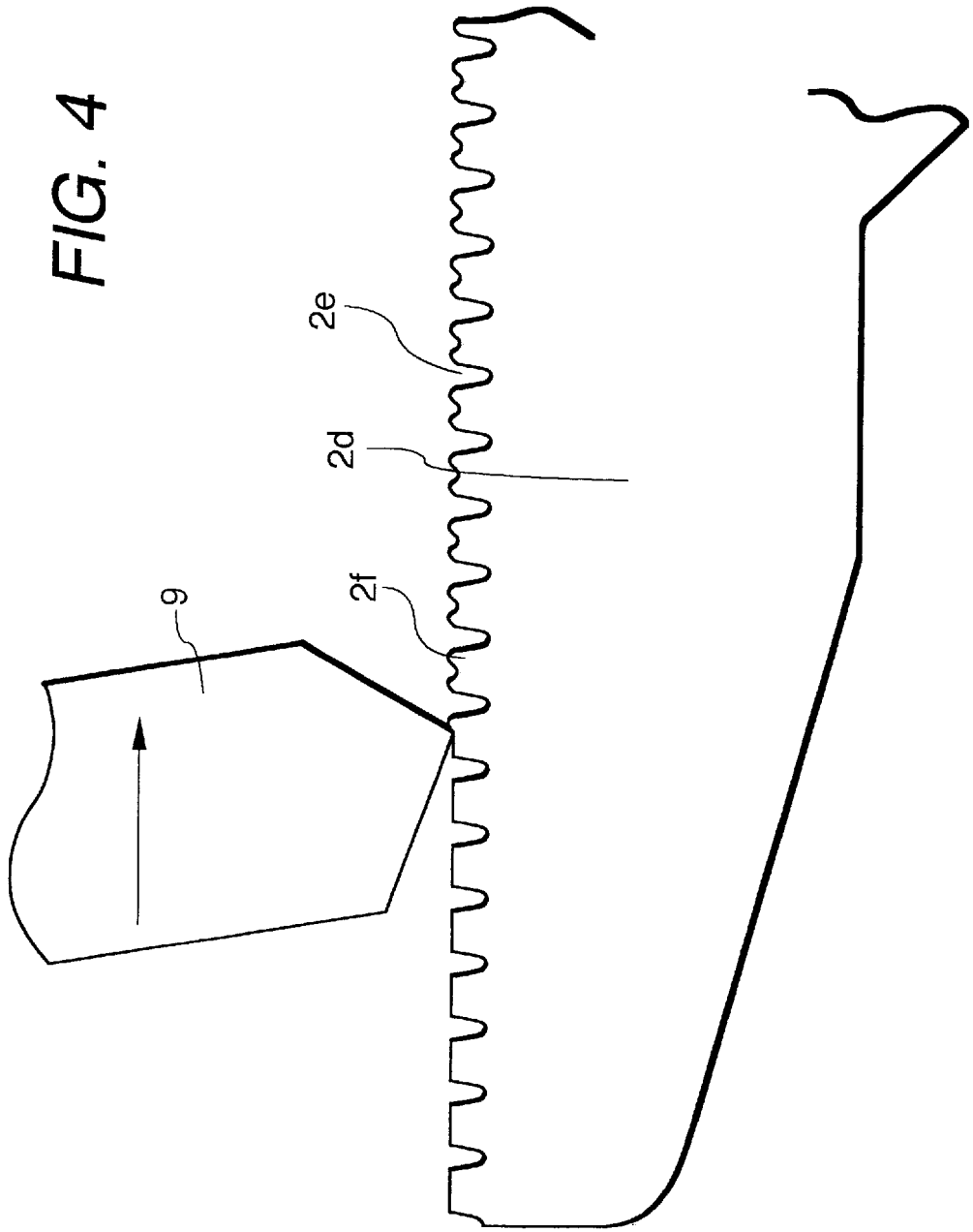

METHOD AND APPARATUS FOR GROOVING ON ROTOR

BACKGROUND OF THE INVENTION

The present invention relates to a method of grooving on the outer surface of the field cores of a rotor of an AC generator for vehicles to reduce an eddy-current loss.

FIG. 16 is a sectional view showing an AC generator for vehicles. FIG. 17 is a side view, partly in cross section, showing a rotor in the AC generator of FIG. 16. FIG. 18 is a side view of the rotor of the AC generator.

In FIG. 1, reference numeral 1 designates a rotary shaft of a generator. Numeral 2 designates a rotor formed with a couple of field cores 2a and 2b, which are secured to the rotary shaft 1. The rotor 2 includes a deeper portion 2c circumferentially formed in the outer surface thereof, and pawl-like magnetic poles 2d alternately arranged into a circular array of magnetic poles, which defines the outer surface of the rotor. Numeral 3 designates a field coil 3 placed in the deeper portion 2c, and numeral 4 indicates a current-feed slip ring put on the rotary shaft 1 on the left side of the field core 2b. A rear bracket 21 includes an intake hole 21a for taking air into the machine from exterior and an exhaust hole 21b. Numeral 22 represents a rectifier 22; 23, a brush holder 23 with a regulator 23a; and 24a and 24b, centrifugal fans attached to the side walls of the field cores 2a and 2b; and 26, a stator, disposed on the outer surface of the rotor 2, including a core 26a and a coil 26b. Numeral 27 designates a front bracket of the generator having an intake hole 27a and an exhaust hole 27b. Numerals 28a and 28b are bearings for the rotary shaft 1.

The operation of the generator thus constructed will be described.

The rotor 2 rotates along the circumference surface of the stator 26, with a gap being present therebetween. During the rotation of the rotor, a magnetic flux developed by the rotor 2 is varied in the gap, to thereby generate a voltage in the core 26a of the stator 26. At this time, an eddy current is caused in the surface (facing the stator 26) of the magnetic poles 2d of the field core of the rotor. To reduce the eddy current loss, grooves 2e are formed in the outer surfaces of the magnetic poles 2d as shown in FIG. 18.

A conventional method of forming the grooves for reducing the eddy current loss will be described.

As shown in FIG. 19, the rotary shaft 1 is supported at both ends by shaft holders 5a and 5b. In this state, a groove rolling cylindrical die 6 is pressed against the outer surfaces of the magnetic poles 2d, to thereby form grooves 2e thereon. At this time, a roller-like die 7 having a flat outer surface is disposed in opposition to the groove rolling cylindrical die 6 with respect to the rotary shaft 1 so that it receives the pressure applied to the magnetic poles by the groove rolling cylindrical die 6, to thereby hold the field cores 2a and 2b.

A case where the grooves are formed by cutting is shown in FIG. 20. In the figure, reference numeral 11 designates a groove tool. To form the grooves 2e, the thread tool 11 is put on the outer surfaces of the magnetic poles 2d of the magnetic poles 2d and axially fed while turning the rotor 2. The formed grooves are spiral in shape, and one groove is formed in the magnetic pole 2d by every turn of the rotor 2.

By convention, the grooves are formed in the rotor 2 in this way. In the rolling grooving method shown in FIG. 19, the pressure applied to the field cores 2a and 2b from the groove rolling cylindrical die 6 is received by the flat surface of the roller-like die 7. Because of this, the formed grooves 2e are frequently deformed to be shallow, so that the eddy-current loss reduction effect by the grooved rotor is deteriorated. When the groove rolling cylindrical die 6 is pressed against the magnetic poles 2d of the field cores 2a and 2b, the magnetic poles 2d receive a pressure by the die in a cantilever fashion as shown in FIG. 21. As a result, the distal end part of each of the magnetic poles 2d is greatly bent in the direction M. In the nonuniform distribution of the pressure, the grooves 2e formed in the base of the magnetic poles 2d are deep, but those formed in the end are shallow since the pressure applied thereto is weaker. Accordingly, the part with the shallow grooves less significantly reduces the loss by the eddy current in the rotor.

In the grooving method shown in FIG. 20, a number of grooves 2e are formed by a single groove tool 11, so that much time is taken for the groove formation. Additionally, the lifetime of the groove tool 11 is shortened, so that the groove tool 11 must frequently be replaced.

SUMMARY OF THE INVENTION

Accordingly, an object of the present invention is to provide a method of forming exact grooves in the outer surface of a rotor, whereby the grooves are uniform in depth over the entire length of the magnetic poles from the base to the tip, thereby preventing the eddy-current loss reduction effect from being locally deteriorated.

Another object of the present invention is to provide a method of forming exact grooves in the outer surface of a rotor which is capable of forming grooves by cutting for a shorter time.

According to the invention, an apparatus for forming grooves on a rotor comprises: rotor holders for supporting a rotor at both ends of a rotary shaft thereof; a groove rolling die for forming grooves in the outer surfaces of the field cores of the rotor; and a holder die, disposed in opposition to the groove rolling die with respect to the rotor, having a groove pattern in conformity with a pattern of the grooves that are formed in the outer surfaces of the field cores by the groove rolling die.

Further, according to the invention, there is provided an apparatus for forming grooves on a rotor having a pair of field cores fastened to a rotary shaft and pawl-like different magnetic poles alternately arranged into a circular array of magnetic poles, which defines the outer surface of the rotor, the apparatus comprising: rotor holders for supporting a rotor at both ends of a rotary shaft thereof; a groove rolling die for forming grooves in the outer surfaces of the field cores of the rotor; a holder die, disposed in opposition to the groove rolling die with respect to the rotor, having a groove pattern in conformity with a pattern of the grooves that are formed in the outer surfaces of the field cores by the groove rolling die; and pole-tip holders for supporting the undersides of the pawl-shaped magnetic poles of the rotor.

Furthermore, according to the invention, there is provided a method of forming grooves on the outer surfaces of the field cores of a rotor in which a groove rolling die and a holder die, having a groove pattern in conformity with a groove pattern of the groove rolling die, are disposed such that the holder die is opposed to the groove rolling die with respect to the rotor, and grooves are formed in the outer surfaces of the field cores of the rotor by the groove rolling die.

Still further, in the grooving method, after grooves are formed in the outer surfaces of the field cores of the rotor, the outer surfaces of the field cores are worked by cutting.

Still further, in the grooving method, after grooves are formed in the outer surfaces of the field cores of the rotor, a roller is pressed against the outer surfaces of the field cores while being rolled.

Still further, in the grooving method, grooves are formed in the outer surfaces of the field cores of the rotor by a cutting tool with a plural number of blades.

Still further, in the grooving method, the plural number of blades of the cutting tool may individually be replaced with a new one.

According to the invention, the holder die has a groove pattern in conformity with a pattern of the grooves that is formed in the outer surfaces of the field cores by the groove rolling die. Therefore, the grooves are formed in the outer surfaces of the field cores of the rotor, without any deformation of the grooves. As a result, a designed eddy-current loss reduction effect is secured.

Further, when the grooves are formed, the undersides of the pawl-shaped magnetic poles of the magnetic poles of the rotor are held. Accordingly, the grooves are uniform in depth over the entire length of the magnetic poles from the root to the top, without the downward deformation of the pawl tips of the magnetic poles.

Furthermore, a deformation of the grooved outer surface of the rotor, which is caused by the groove forming work, is removed by cutting, so that the rotor has an exact grooved outer surface as designed.

Moreover, the pressurizing roller is pressed against the grooved outer surface of the rotor, which is deformed by the groove forming work, so that the wavy tops of the raised portions on the grooved outer surface of the field cores are pressed down to expand sideways and to be flattened. As a result, the outer surface area of the field core, which is reduced by the grooves formed thereon, is somewhat increased.

Still further, grooves are formed in the outer surfaces of the field cores of the rotor by a cutting tool with a plural number of blades. Accordingly, the lifetime of the cutting tool is longer, thus resulting in an infrequent replacement of it with a new one.

Still further, a plural number of blades of the cutting tool may individually be replaced with a new one. A blade saving is secured.

BRIEF DESCRIPTION OF THE DRAWINGS

FIG. 4 is an enlarged view showing a key portion of the grooving work by a third embodiment of the present invention;

DETAILED DESCRIPTION OF PREFERRED EMBODIMENTS

1st Embodiment

A first embodiment of the present invention will be described with reference to the accompanying drawings.

Figure 1:
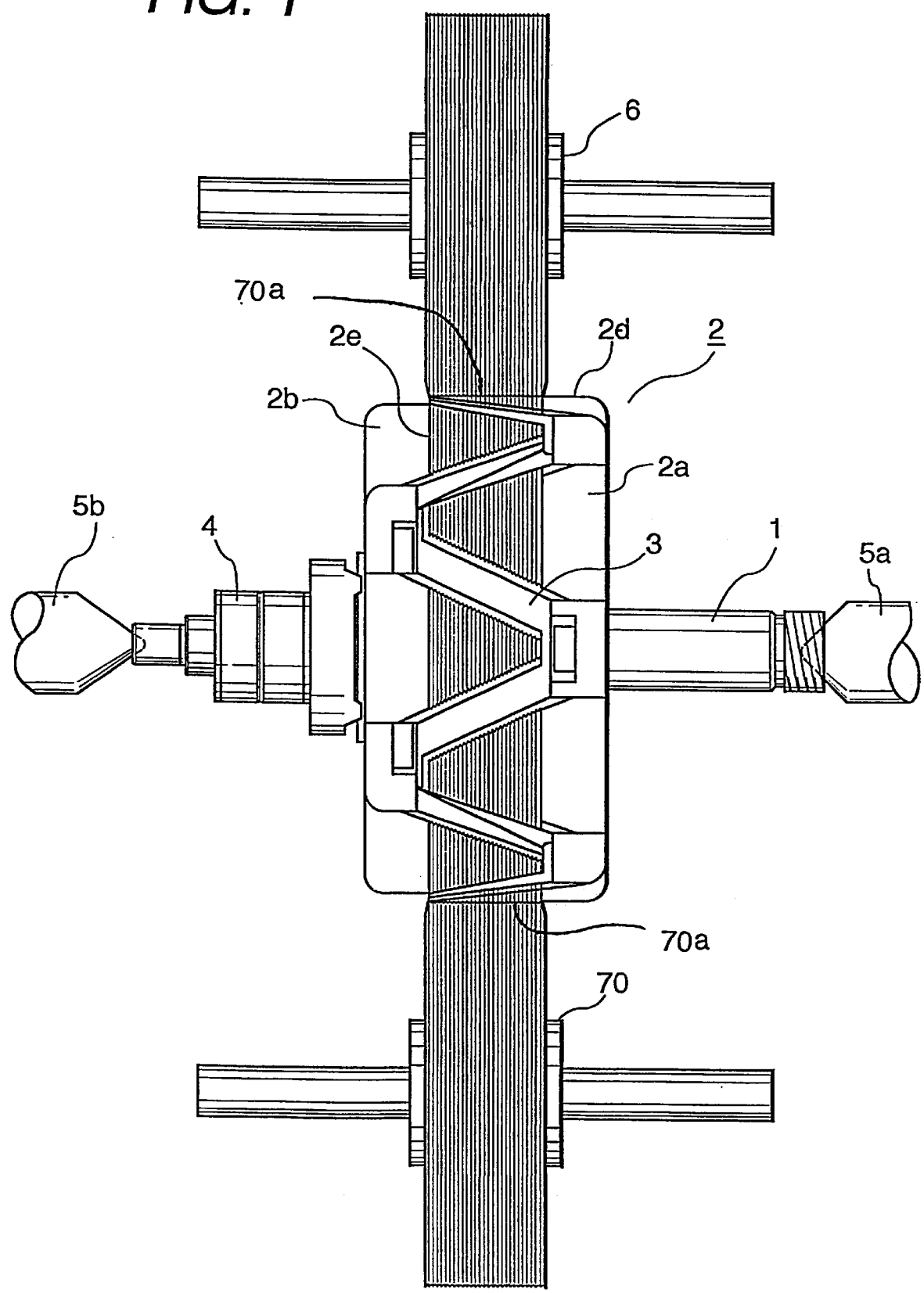
FIG. 1 is a side view showing a workpiece for forming grooves on a rotor according to a first embodiment of the present invention.
Figure 2:
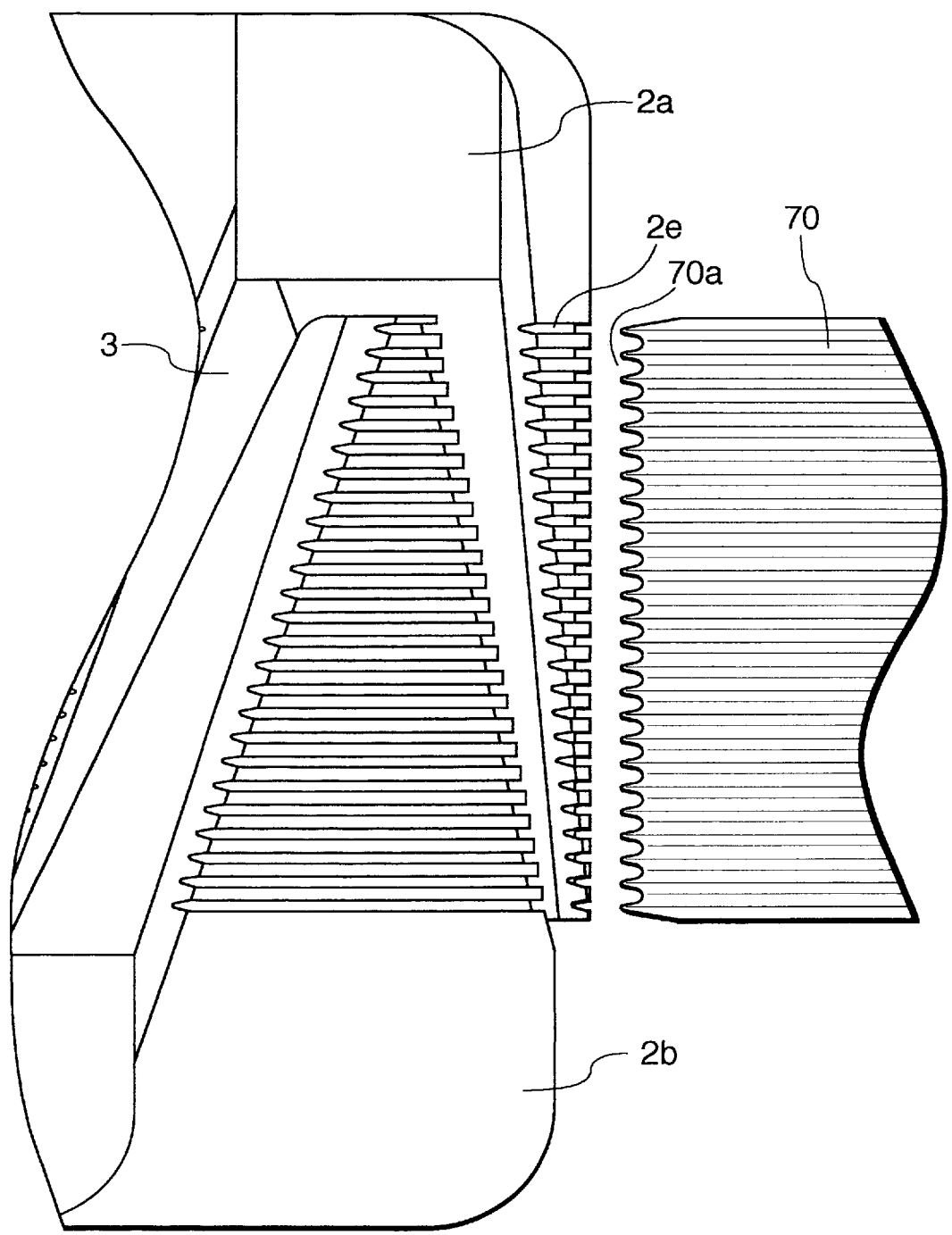
FIG. 2 is an enlarged view showing a key portion of the grooving workpiece by the first embodiment.

FIG. 1 is a view showing a method and an apparatus for forming grooves in the outer surface of a rotor by rolling, which is an embodiment of the present invention. In the figure, reference numeral 70 designates a holder die for receiving a pressure by a groove rolling cylindrical die 6. The groove rolling cylindrical die 6 has a groove pattern 70a in conformity with a pattern of grooves 2e to be formed on the field cores 2a and 2b, as shown in FIG. 2. The holder die 70 is made of the same material as the groove rolling cylindrical die 6, for example, cold metal mold steel. The remaining construction of the grooving apparatus is substantially the same as that of the conventional apparatus, and hence no further description thereof will be given.

In the first embodiment, the holder die 70 has the groove pattern 70a in conformity with the grooves 2e to be formed in the outer surface of the rotor. Therefore, the grooves 2e formed in the outer surfaces of the magnetic poles 2d of the field cores will not be deformed.

2nd Embodiment

Figure 3A:
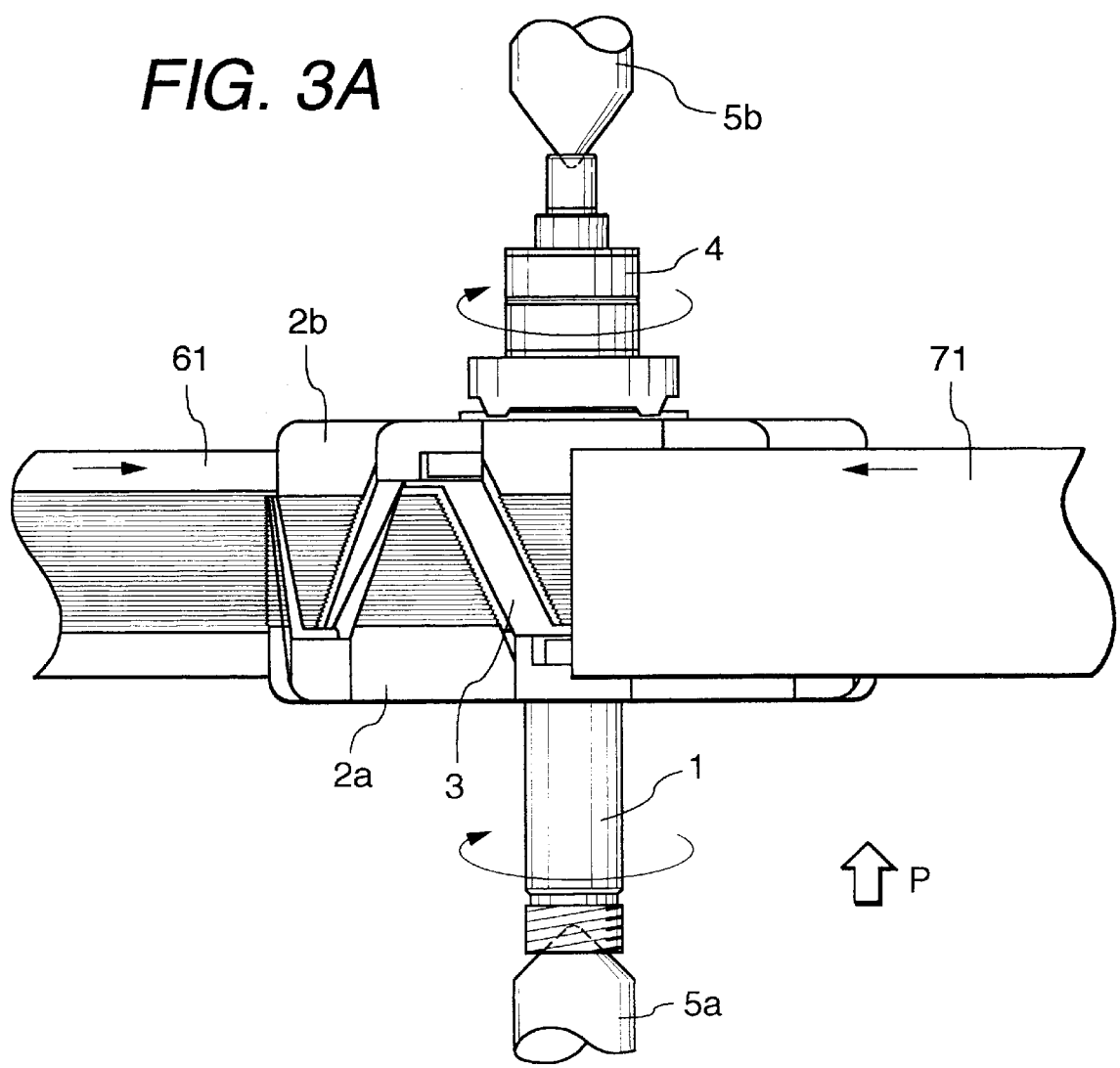
FIGS. 3A and 3B are a plan view and a side view showing a workpiece for forming grooves on a rotor according to a second embodiment of the present invention.
Figure 3B:
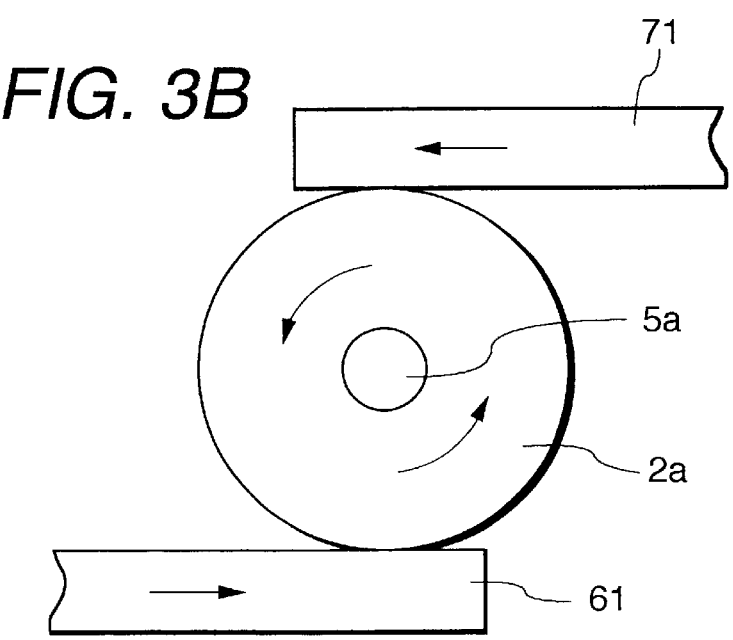

FIGS. 3A and 3B are plan views showing an apparatus for forming grooves in the outer surface of a rotor according to a second embodiment of the present invention. While in the first embodiment, the groove rolling cylindrical die 6 and the holder die 70 are shaped like a roller, those dies 61 and 71 may be constructed in rack shape to be rectilinearly moved as shown.

3rd Embodiment

In the present embodiment, grooves 2e are first formed in the surfaces of the magnetic poles 2d of the field cores by the grooving method of the first or second embodiment. Then, as shown in FIG. 4, the wavy tops 2f of the raised portions on the grooved surfaces of the magnetic poles 2d of the field cores 2a and 2b are cut out to be flat, by a cutting tool 9. By so doing, the deformed outer surface of the stator core 2 may be uniformly shaped. Further, the circular array of the pawl-like magnetic poles which is deformed in shape by the pressure of the groove rolling cylindrical die 6 or 61, may be corrected to the original one.

4th Embodiment

Figure 5A:
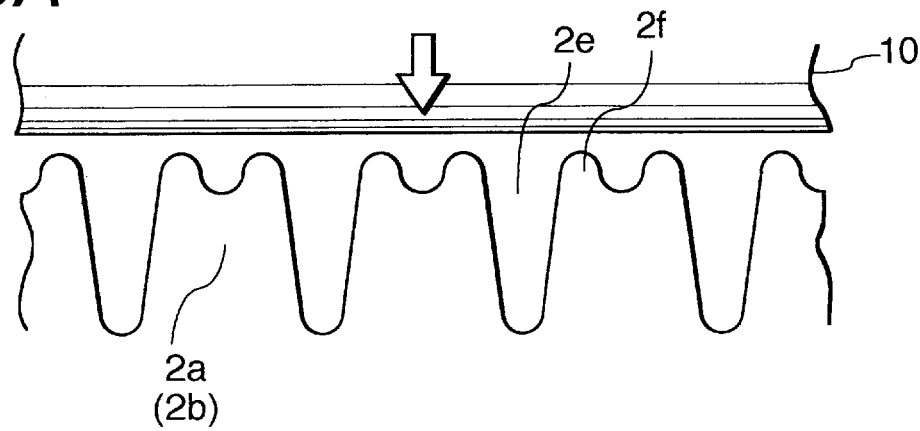
FIGS. 5A to 5C are enlarged views showing a key portion of the grooving work by a fourth embodiment of the present invention.
Figure 5B:
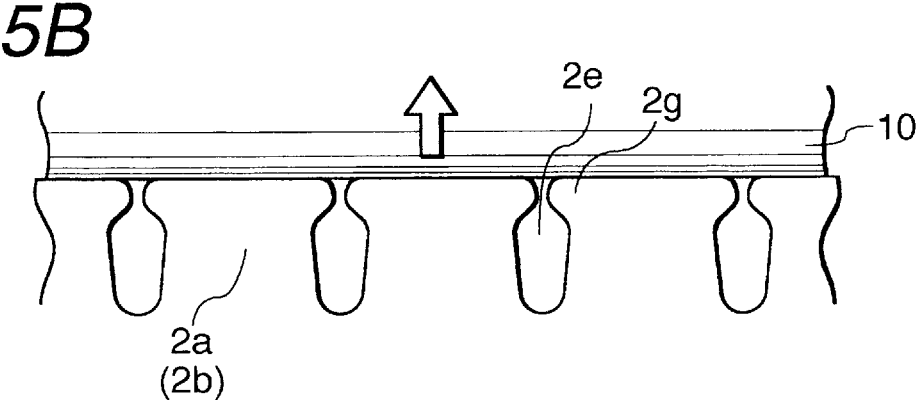
Figure 5C:
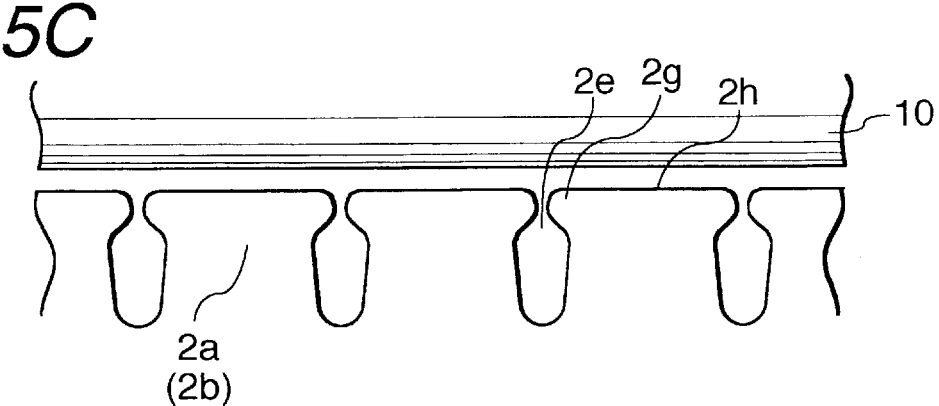

As described above, the wavy tops 2f of the raised portions on the grooved surfaces of the magnetic poles 2d of the field cores 2a and 2b are cut out to be flat, in the third embodiment. In the fourth embodiment, as shown in FIG. 5, a pressurizing roller 10 with a flat surface is pressed against the grooved surface of the field core 2a (2b) (FIG. 5A). By the pressing operation, the wavy tops 26 of the raised portions on the grooved outer surface of the field cores 2a and 2b are pressed down to expand sideways to be flattened, so that the raised portions each have expanded portions 2g on both sides thereof as shown (FIG. 5B). As a result, the outer surface area 2h of the field core 2a (2b), which is reduced by the grooves 2e formed thereon, is somewhat recovered (FIG. 5C).

5th Embodiment

Figure 6A:
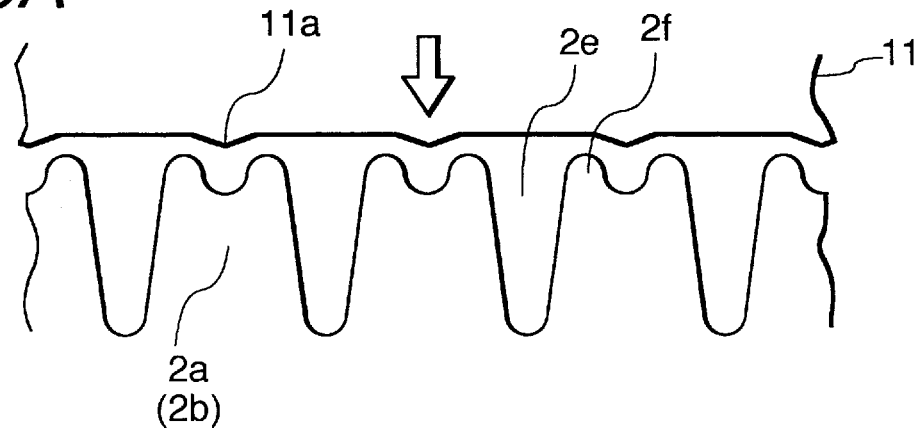
FIGS. 6A to 6C are enlarged views showing a key portion of the grooving work by a fifth embodiment of the present invention.
Figure 6B:
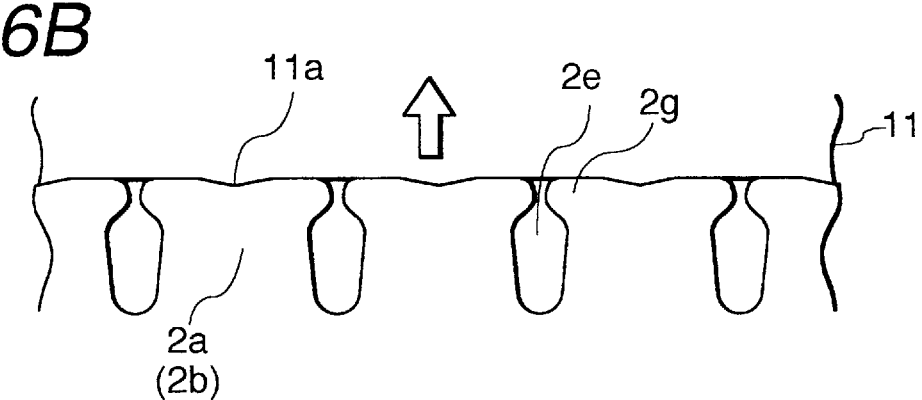
Figure 6C:
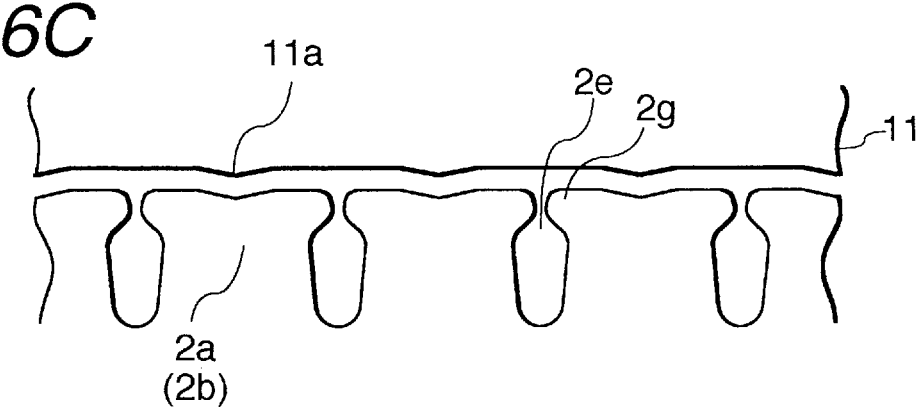
Figure 7:
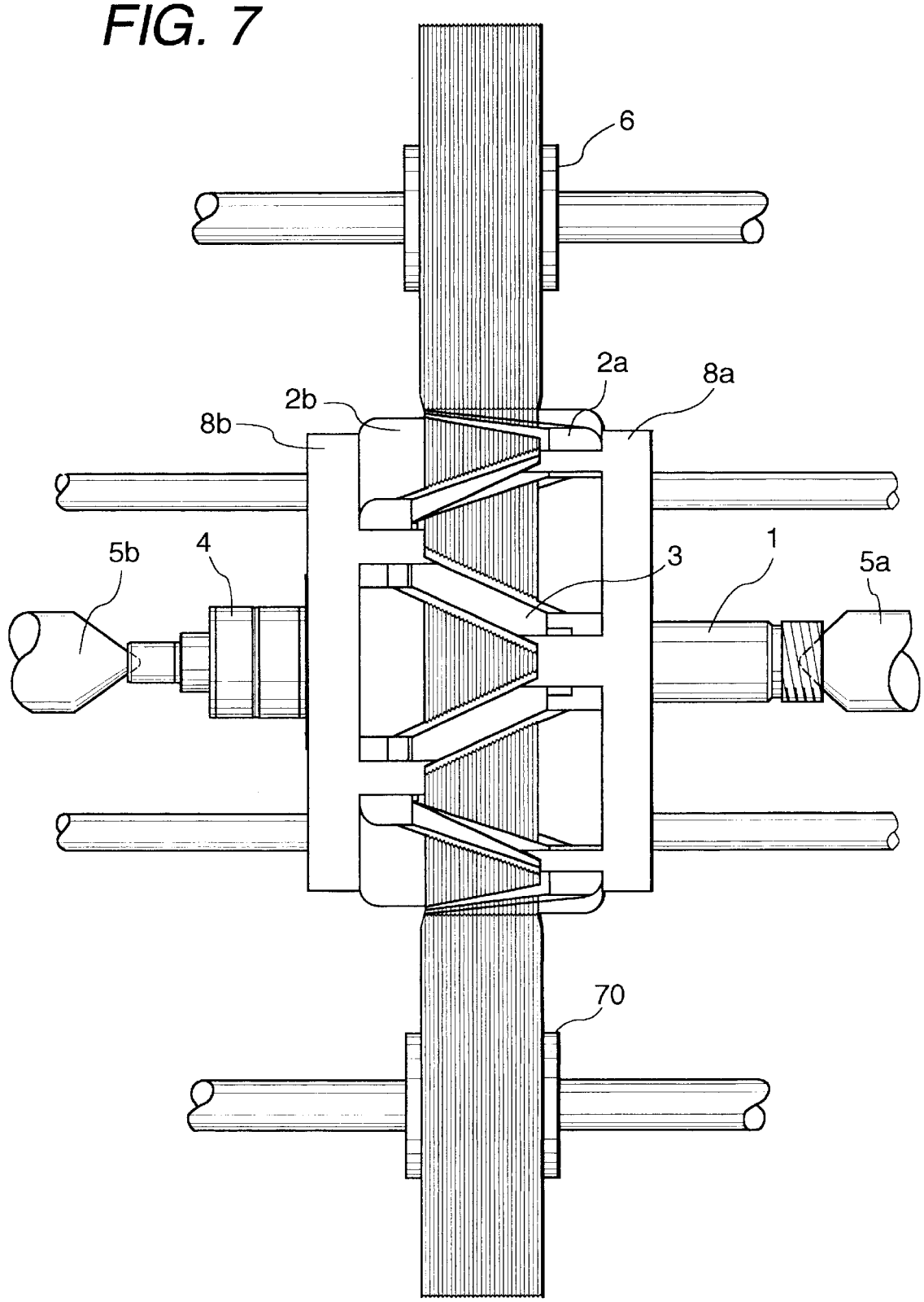
FIG. 7 is an enlarged view showing the grooving work by a sixth embodiment of the present invention.

In the fourth embodiment of the present invention, the pressurizing roller 10 having the flat outer surface is used, as mentioned above. In the fifth embodiment, a pressurizing roller 11 has a series of outward curved portions 11a on the outer surface thereof. When the pressurizing roller 11 is pressed against the grooved surfaces of the field cores, 2a and 2b, these outward curved portions 11a are respectively put in the spaces defined by the wavy tops 2f of the raised portions of the grooved outer surfaces of the magnetic poles 2d of the field cores 2a and 2b. As a result, the wavy tops 2f of the raised portions are effectively pressed and expanded sideways to have expanded portions 2g on both sides thereof, as shown in FIGS. 6A to 6C. Then, the pressurizing roller 10 having the flat outer surface, used in the embodiment 4, is used again to flatten the expanded tops of the raised portions on the grooved surfaces of the magnetic poles 2d of the field cores 2a and 2b. Thus, in the fifth embodiment, the wavy tops 2f of the raised portions on the grooved surfaces of the magnetic poles 2d are effectively and reliably expanded sideways in the flattening process of pressing the wavy tops 2f.

6th Embodiment

Figure 8:
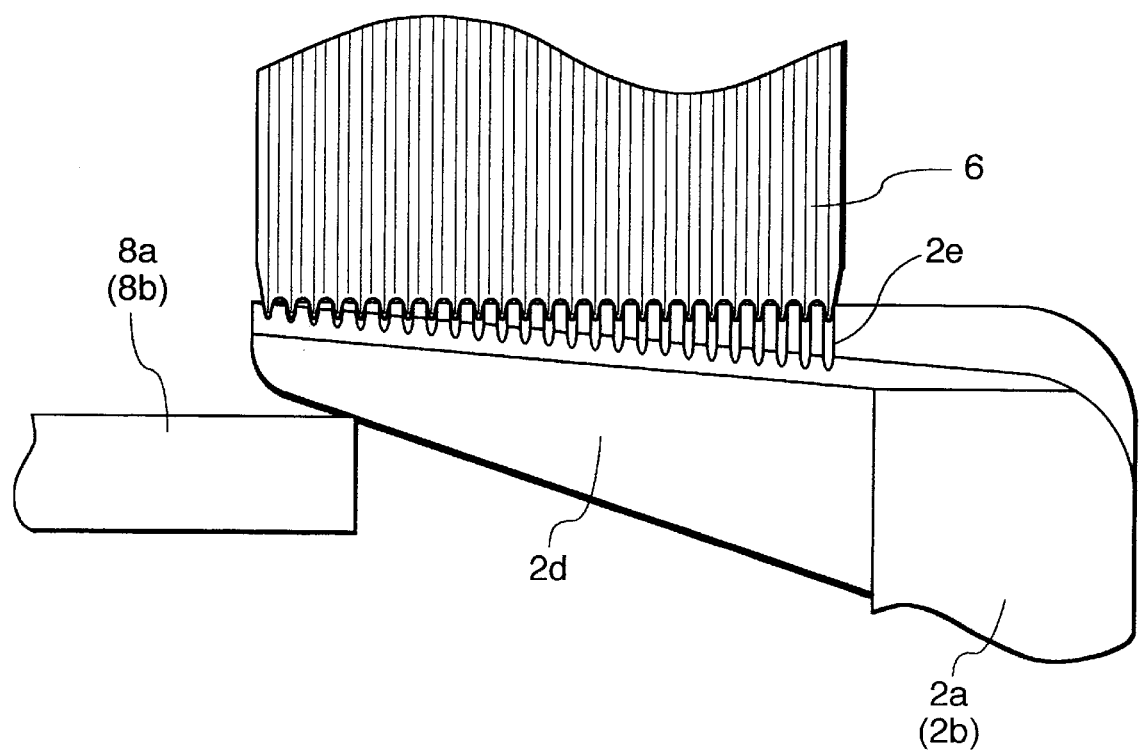
FIG. 8 is an enlarged view showing a key portion of the grooving work by the sixth embodiment.
Figure 9:
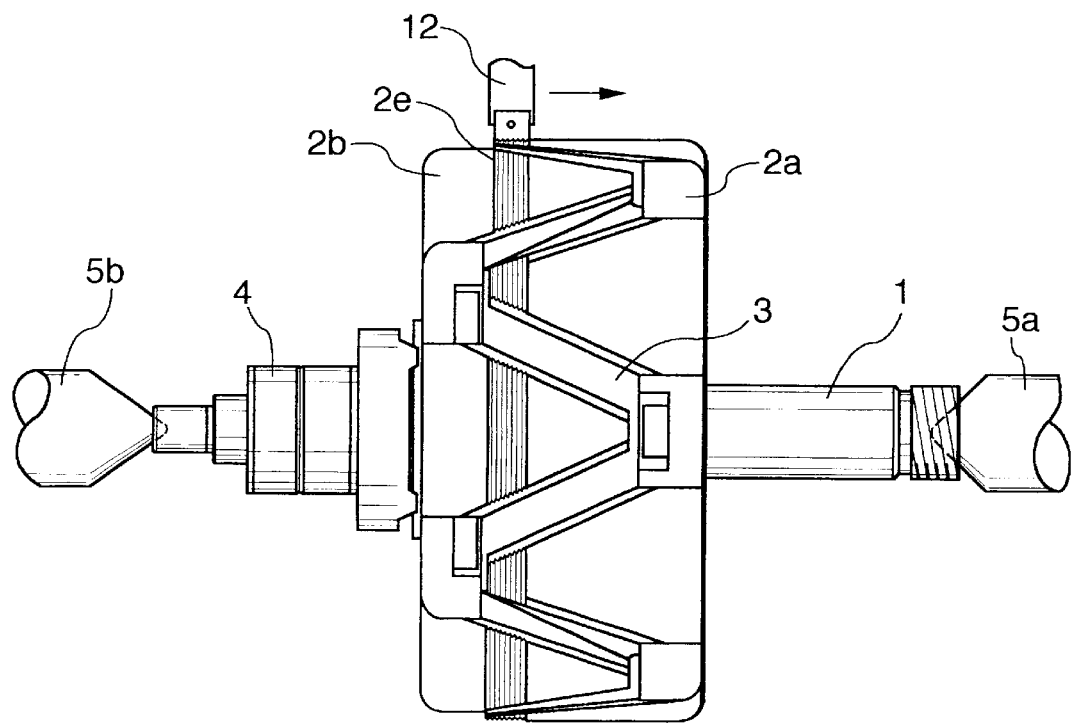
FIG. 9 is an enlarged view showing the grooving work by a seventh embodiment of the present invention.

FIG. 8 is a view showing an apparatus for forming grooves in the outer surface of a rotor by rolling, which is a sixth embodiment of the present invention. FIG. 9 is an expanded side view showing a key portion of the grooving apparatus of FIG. 8. In the figures, reference numerals 1 to 6, and 70 designate like portions in FIG. 1. Reference numerals 8a and 8b designate pole-tip holders. The pole-tip holders 8a and 8b are inserted through the space between the field cores 2a and 2b and support the undersides of the pawl-shaped magnetic poles 2d.

It is noted here that the pole-tip holders 8a and 8b support the undersides of the rotor 2. Because of this, the downward deformation of the pawl tips of the magnetic poles 2d will not take place when the peripheral part of the field cores 2a and 2b are compressively held by the groove rolling cylindrical die 6 and the roller-like die 7. Accordingly, grooves are formed uniformly over the range of each magnetic pole 2d from the root thereof to the pawl tips.

7th Embodiment

Figure 10:
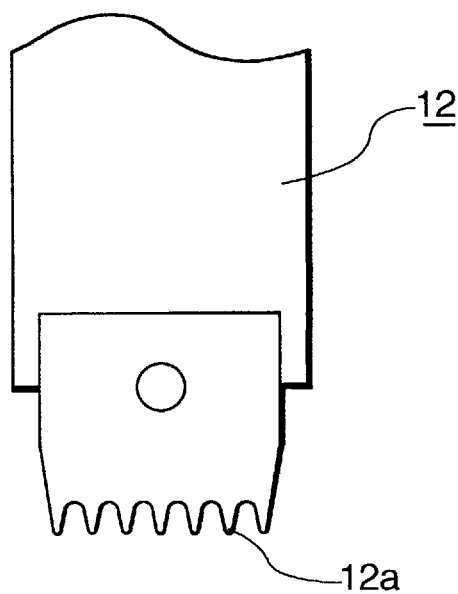
FIG. 10 is a view showing a cutting tool used in the seventh embodiment.

FIG. 9 is a side view showing an apparatus for forming grooves in the outer surface of a rotor according to a seventh embodiment of the present invention. FIG. 10 is a view showing a cutting tool used for the seventh embodiment.

In the figure, reference numeral 12 designates a cutting tool, for example, a thread cutting tool. The cutting tool 12, as shown in FIG. 10, has a plural number of cutters 12a for simultaneously forming a plural number of grooves 2e in the outer surface of the field cores of the rotor. In use, the cutting tool 12 is axially fed while rotating the rotor 2. The formed grooves are spiral in shape.

Figure 11:
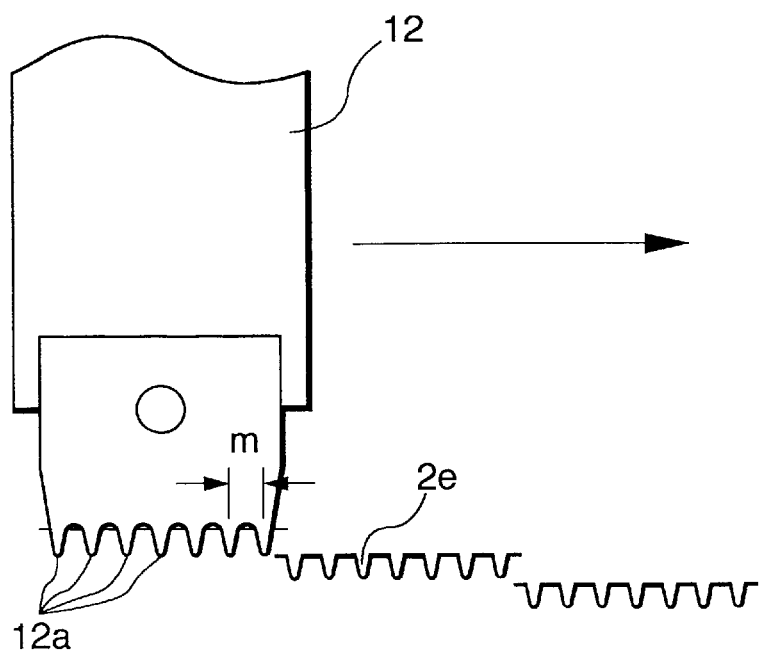
FIG. 11 is a view showing an example of a cutting method in the seventh embodiment.

One of the possible cutting methods is to cut the outer surface of the field core with the cutters 12a of the cutting tool 12 for forming new grooves for each cutting operation, as shown in FIG. 11. In a case where the cutting tool 12 of which the cutters 12a are arrayed at pitches m, for example, is used, N number of grooves at pitches m are simultaneously formed every turn of the rotor 2 when the cutting tool 12 is axially moved a distance of N×m every turn of the rotor.

Figure 12:
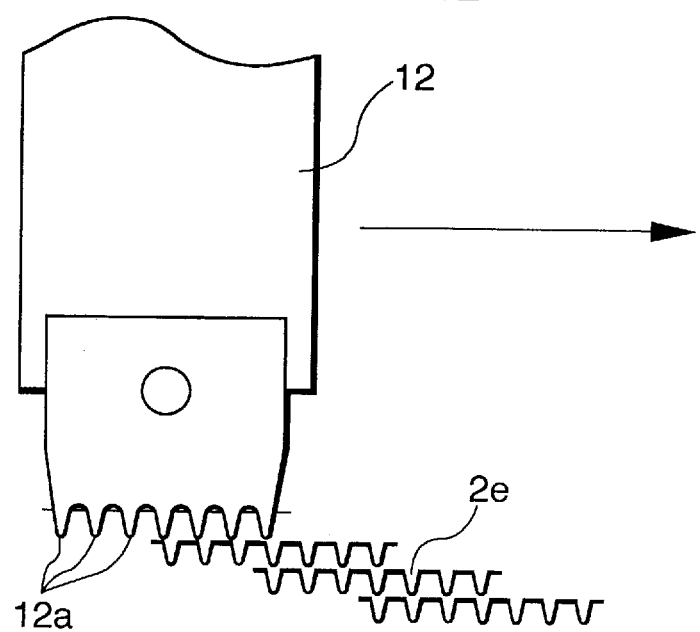
FIG. 12 is a view showing an example of another cutting method in the seventh embodiment.

In another cutting method shown in FIG. 12, the cutting operation of the cutting tool 12 is controlled so that the cut areas on the outer surface of the field core partially overlap as shown.

The grooving apparatus of the seventh embodiment can form the grooves in the outer surface of the field core more quickly than the conventional grooving apparatus which forms grooves one by one. Accordingly, the lifetime of the cutting tool 12 is longer, thus resulting in an infrequent replacement of it with a new one.

8th Embodiment

Figure 13:
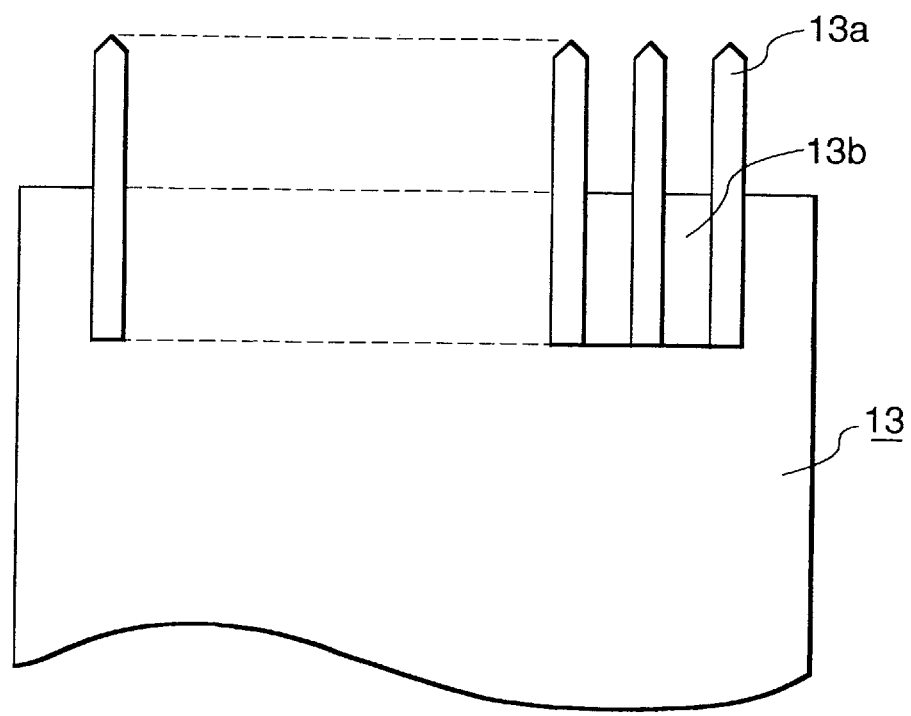
FIG. 13 is a view showing a cutting tool used in an eighth embodiment of the present invention.
Figure 14:
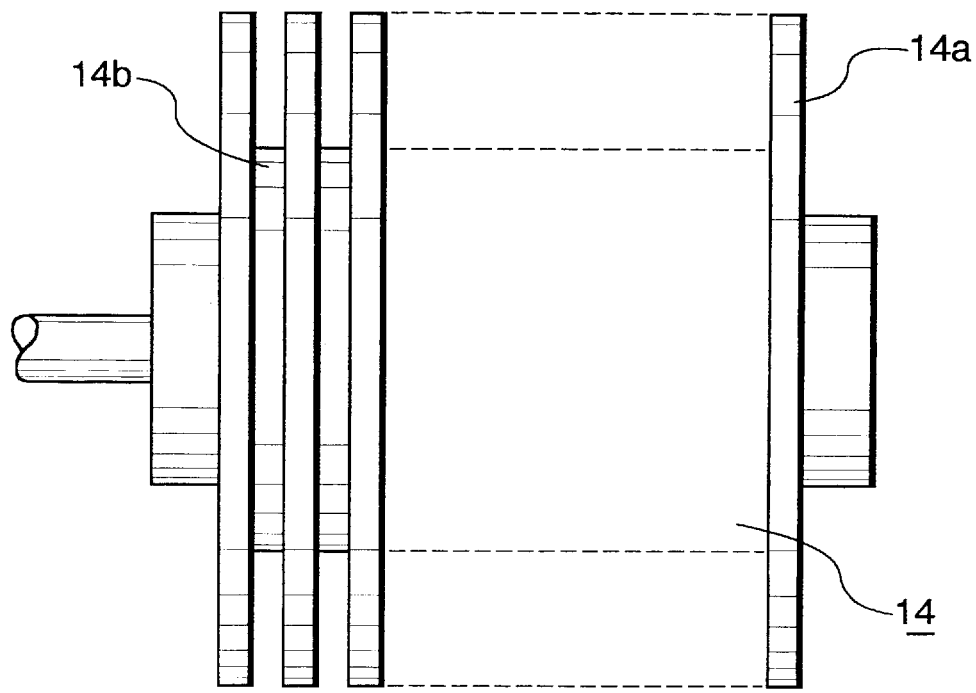
FIG. 14 is a view showing an example of another cutting method in a ninth embodiment according to the present invention.

In the seventh embodiment, the thread cutting tool is used for the cutting tool 12. This may be replaced by a thread rolling flat cutting tool 13 provided with slow-away chips 13a and spacers 13b as shown in FIG. 13. In this case, when one of the slow-away chips 13a is defective, the defective chip alone is replaced with a new one.

9th Embodiment

Figure 15:
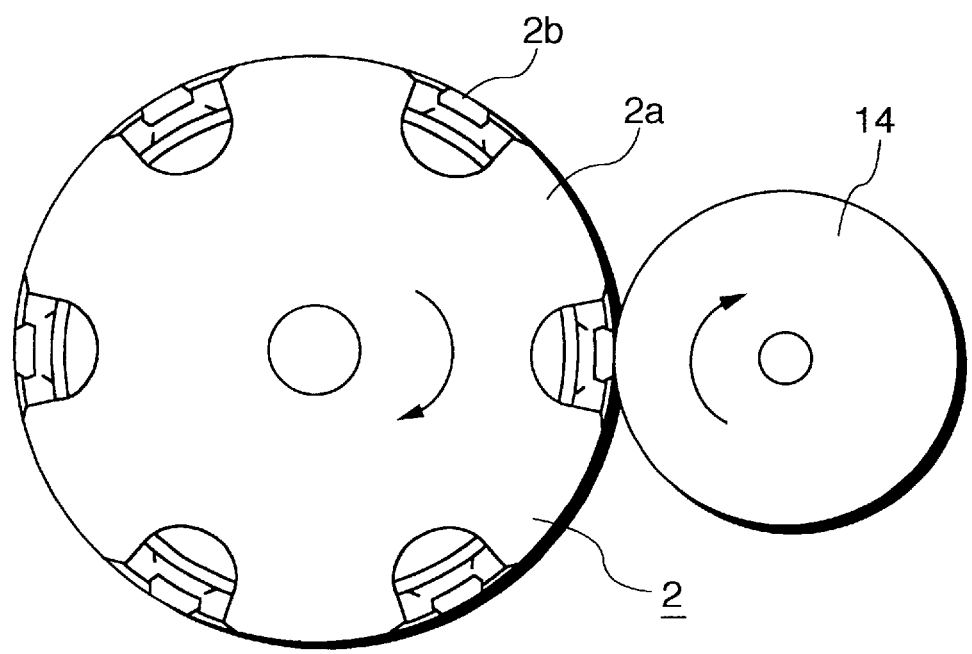
FIG. 15 is a side view showing a cutting method of the ninth embodiment.
Figure 16:
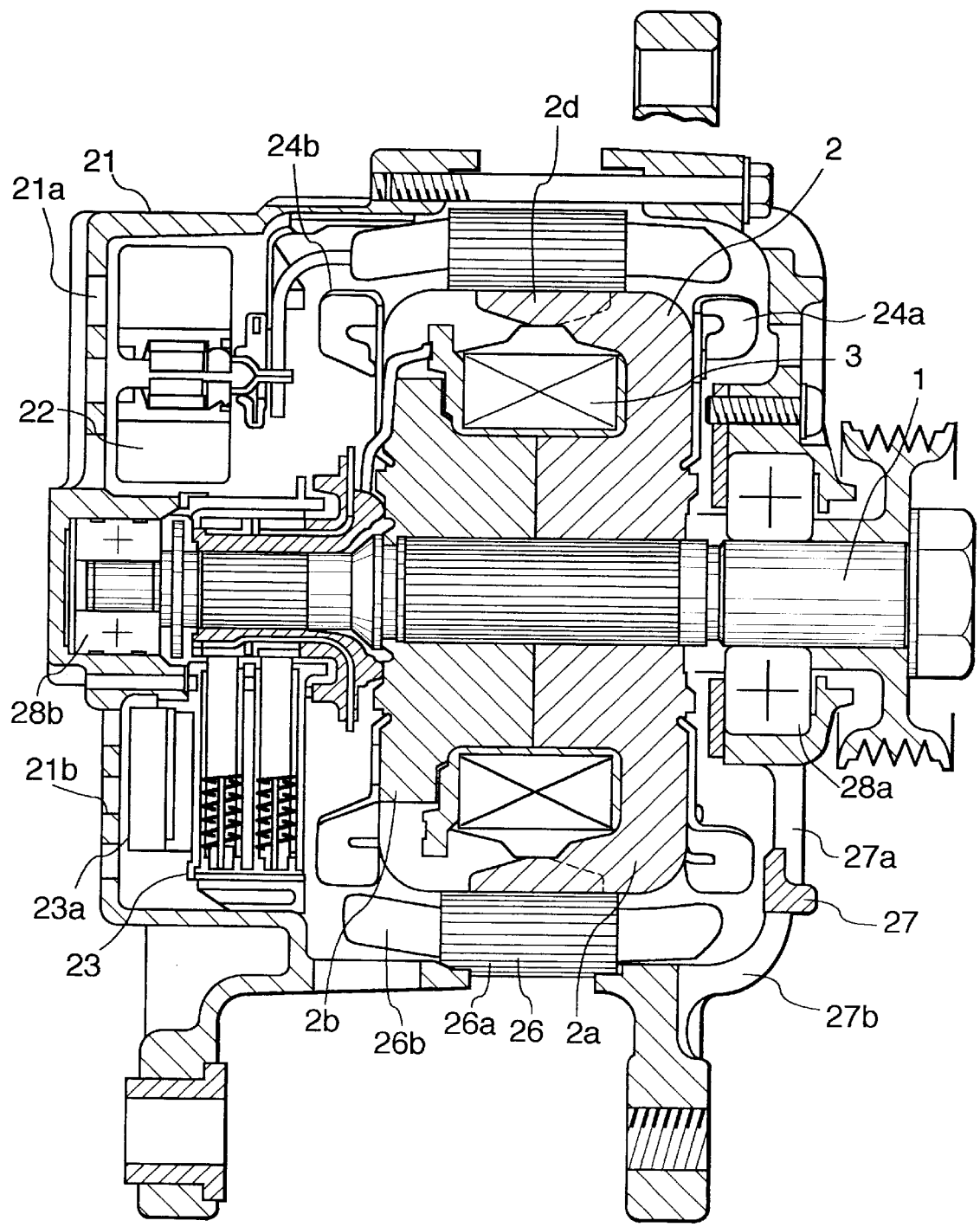
FIG. 16 is a cross sectional view showing an AC generator for motor vehicles.
Figure 17:
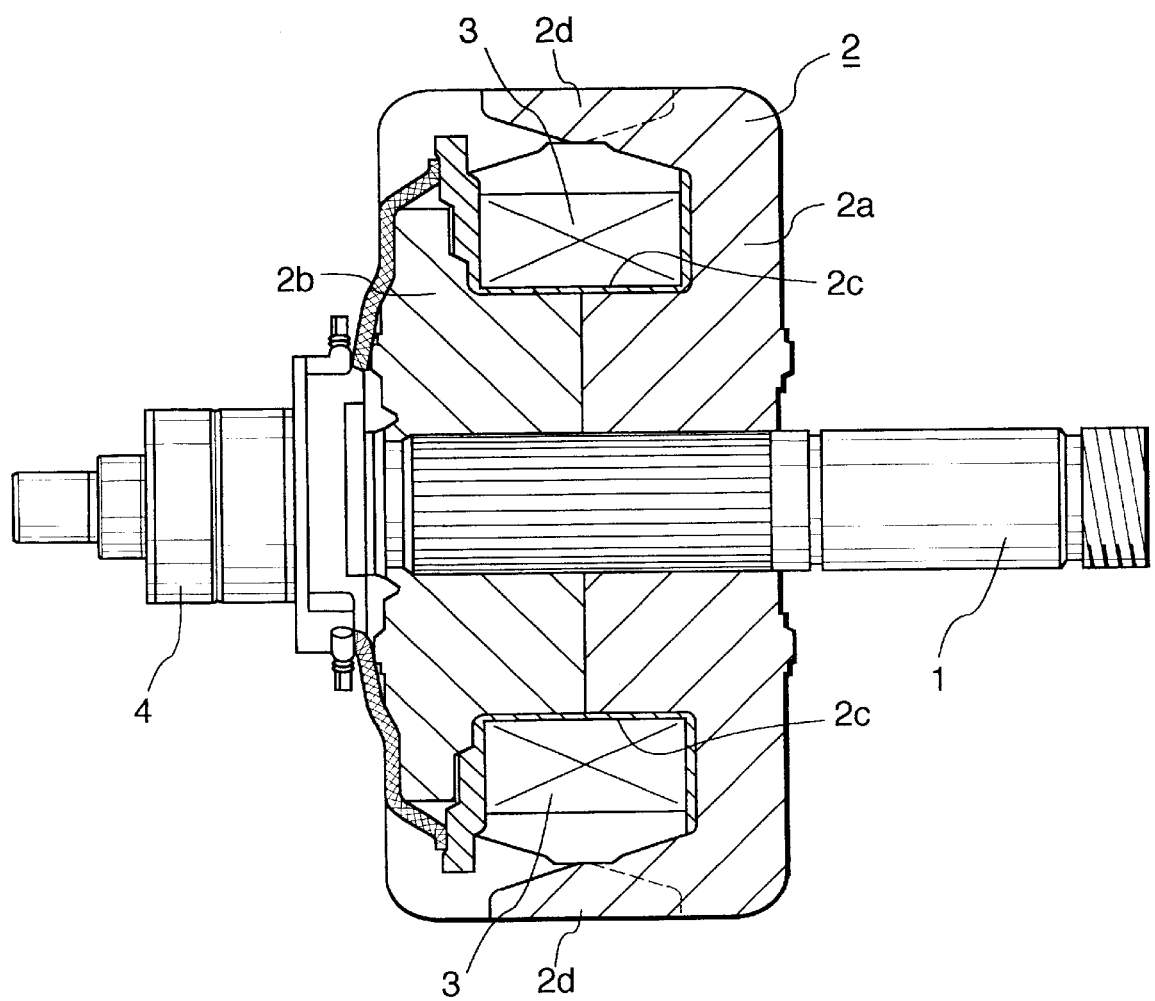
FIG. 17 is a side view, partly in cross section, showing a rotor in the AC generator of FIG. 16.
Figure 18:
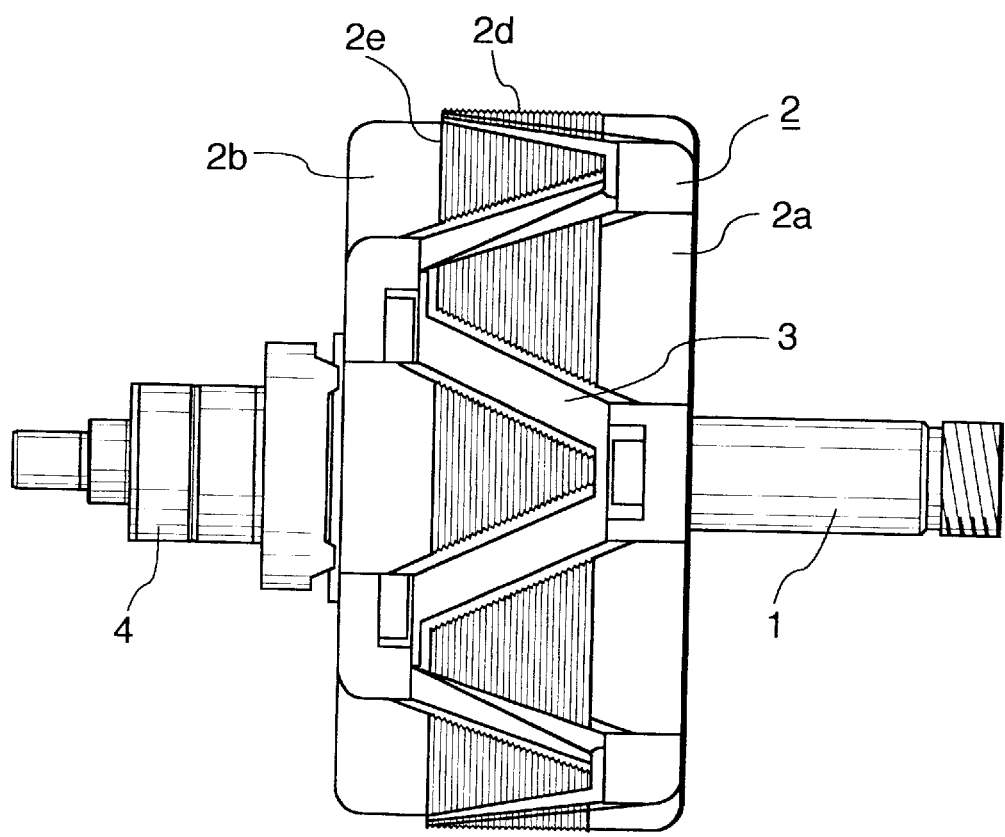
FIG. 18 is a side view of the rotor of the AC generator of FIG. 16.
Figure 19:
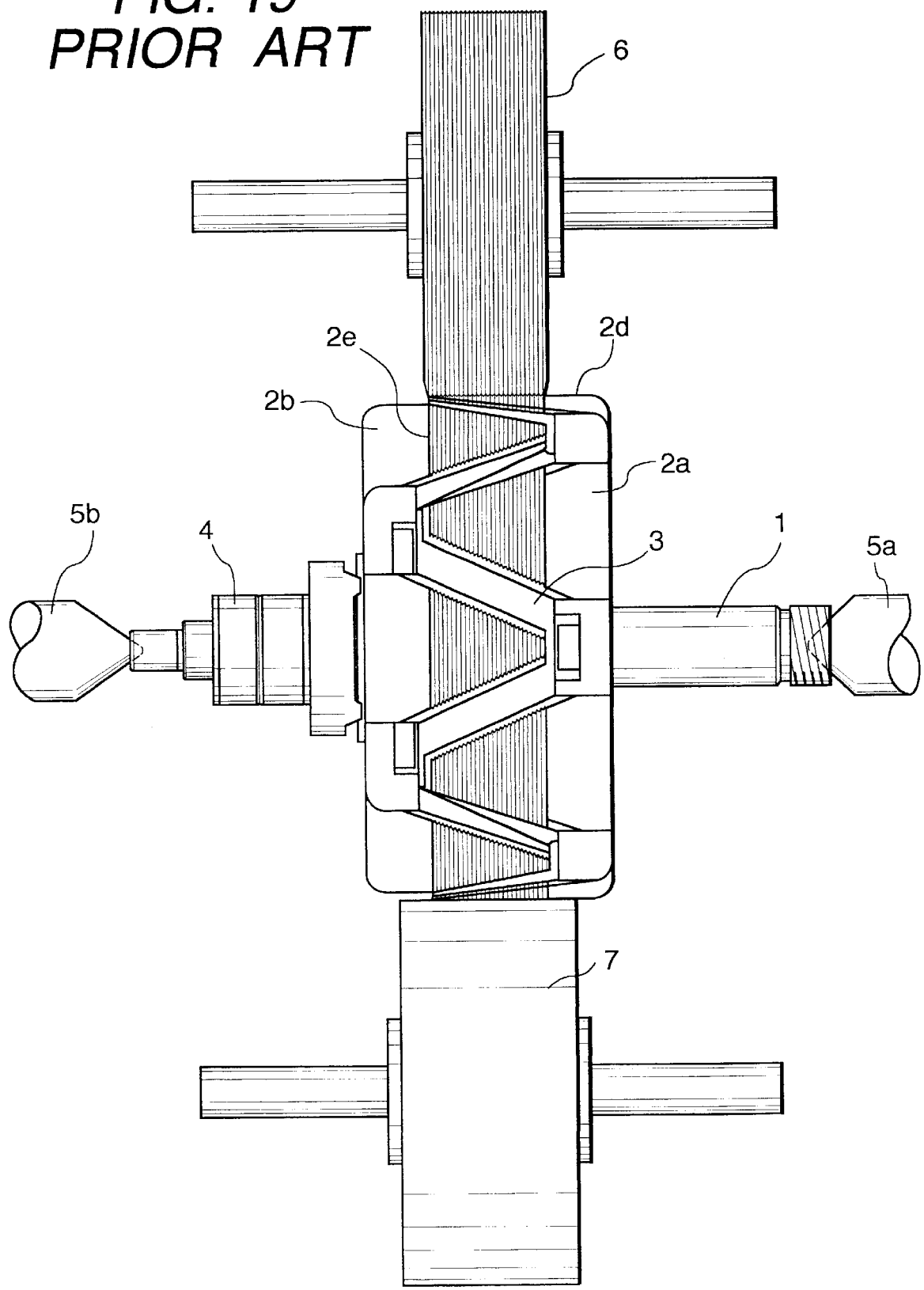
FIG. 19 is a side view showing a conventional workpiece forming grooves on the rotor by rolling.
Figure 20:
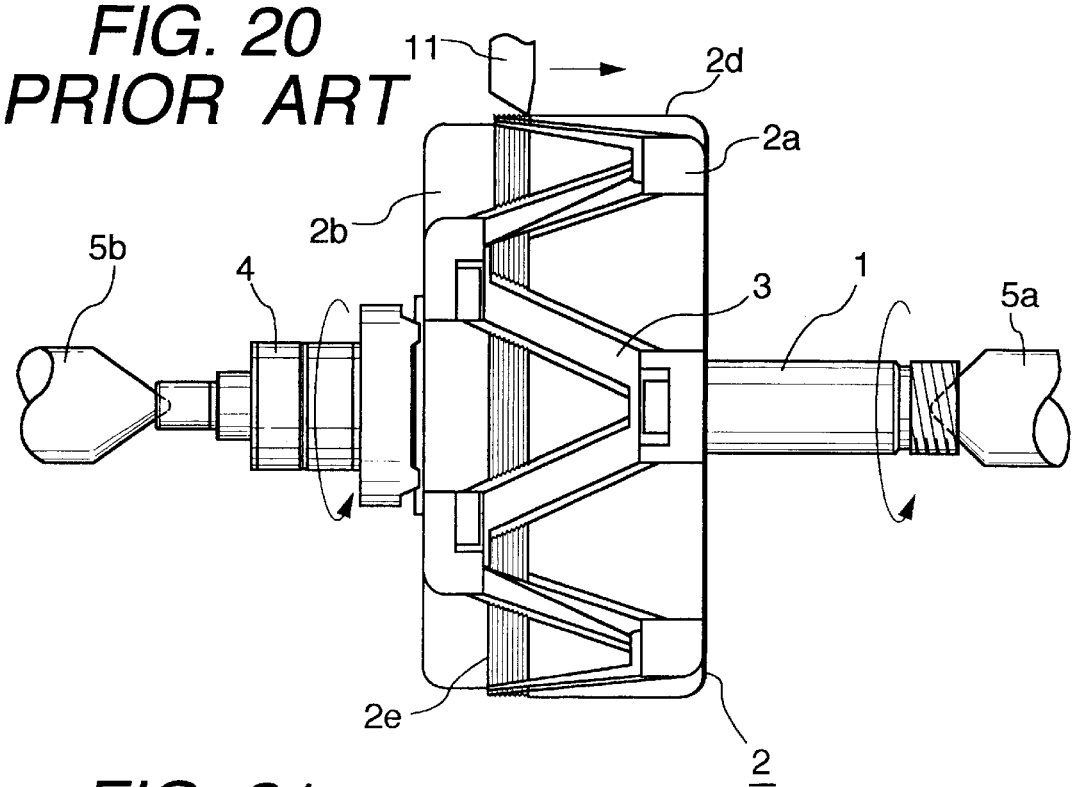
FIG. 20 is a side view showing a conventional workpiece forming grooves on the rotor by cutting.
Figure 21:
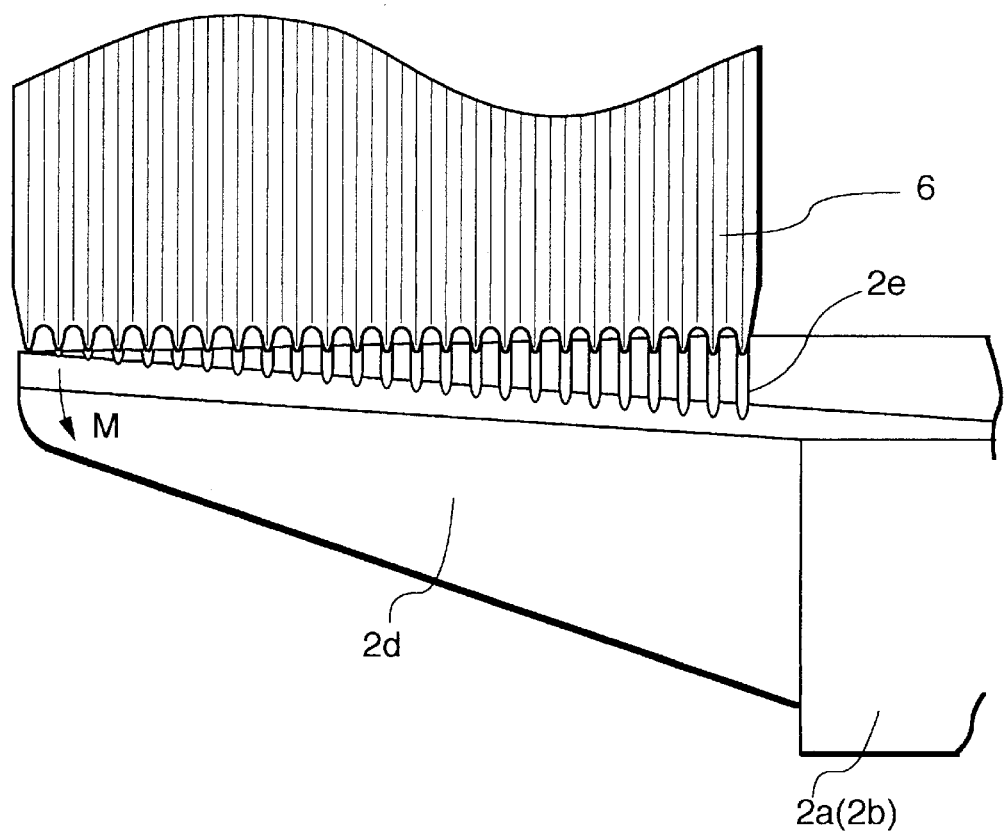
FIG. 21 is an enlarged view showing a key portion of a conventional work of forming grooves on the rotor.

In the seventh and the eighth embodiment, the thread cutting tool and the thread rolling flat cutting tool are used for the cutting tool. The ninth embodiment employs a multi-saw cutter 14 constructed such that multiple metal saws 14a are arrayed side by side in a state that the metal saws 14a are properly spaced by spacers 14b, as shown in FIG. 15. In the grooving operation, the rotor 2 as a workpiece and the cutter 14 are rotated, to thereby contouring-work the outer surface of the rotor.

In the grooving apparatuses as mentioned above, the holder die has a groove pattern in conformity with a pattern of the grooves that are formed in the outer surfaces of the field cores by the groove rolling die. Therefore, the grooves are formed in the outer surfaces of the field cores of the rotor, without any deformation of the grooves. As a result, a designed eddy-current loss reduction effect is secured.

Further, when the grooves are formed, the undersides of the pawl-shaped magnetic poles of the magnetic poles of the rotor are held. Accordingly, the grooves are uniform in depth over the entire length of the magnetic poles from the root to the top, without the downward deformation of the pawl tips of the magnetic poles.

Furthermore, a deformation of the grooved outer surface of the rotor, which is caused by the groove forming workpiece, is removed by cutting, so that the rotor has an exact grooved outer surface as designed.

Moreover, the pressurizing roller is pressed against the grooved outer surface of the rotor, which is deformed by the groove forming workpiece, so that the wavy tops of the raised portions on the grooved outer surface of the field cores are pressed down to expand sideways and to be flattened. As a result, the outer surface area of the field core, which is reduced by the grooves formed thereon, is somewhat increased.

Still further, grooves are formed in the outer surfaces of the field cores of the rotor by a cutting tool with a plural number of blades. Accordingly, the lifetime of the cutting tool is longer, thus resulting in an infrequent replacement of it with a new one.

Still further, a plural number of blades of the cutting tool may individually be replaced with a new one. A blade saving is secured.

What is claim is:

1. An apparatus for forming grooves on a rotor comprising:

rotor holders for supporting a rotor at both ends of a rotary shaft thereof, the rotor having a pair of field cores with outer surfaces, said field cores being fastened to the rotary shaft and said rotor including pawl-shaped magnetic poles alternately arranged into a circular array of magnetic poles, which define an outer surface of the rotor;

a groove rolling die having a groove pattern for forming grooves in the outer surface of the rotor;

a holder die, disposed in opposition to the groove rolling die with respect to the rotor, having a groove pattern conforming with the groove pattern of the groove rolling die; and pole-tip holders for supporting the undersides of the pawl-shaped magnetic poles of the rotor.

2. The apparatus as claimed in claim 1, wherein said groove rolling die and said holder die are of roller shape.

3. The apparatus as claimed in claim 1, wherein said groove rolling die and said holder die are of rack shape.

4. A method of forming grooves on outer surfaces of field cores of a rotor, comprising the steps of:

providing a groove rolling die having a groove pattern;

providing pole-tip holders for supporting undersides of pawl-shaped magnetic poles provided on the rotor;

disposing a holder die, having a groove pattern conforming with the groove pattern of the groove rolling die, in opposition to the groove rolling die with respect to the rotor;

forming grooves in the outer surfaces of the field cores of the rotor using the groove rolling die and the holder die.

5. The grooving method as claimed in claim 4, further comprising an additional step of removing wavy tops formed on raised portions of the outer surfaces of the field cores of the rotor, said raised portions and said wavy tops on said raised portions being formed by the previous step of forming grooves in the outer surfaces of the field cores of the rotor.

6. The grooving method as claimed in claim 4, further comprising an additional step of pressing a roller against wavy tops formed on raised portions of the outer surfaces of the field cores of the rotor, said raised portions and said wavy tops on said raised portions being formed by the previous step of forming grooves in the outer surfaces of the field cores of the rotor.

7. The grooving method as claimed in claim 6, wherein said roller has outward curved portions.

* * * * *